Reissued Jan. 22, 1935 Re. 19,437

UNITED STATES PATENT OFFICE 19,437

VAT DYESTUFFS OF THE ACRIDONE AND THIOXANTHONE SERIES AND THE PROCESS OF MAKING THEM

Paul Nawiasky, Ludwigshafen-on-the-Rhine, Wilhelm Bauer, Leverkusen, and Emil Krauch, Ludwigshafen-on-the-Rhine, Germany, assignors to General Analine Works, Inc., New York, N. Y., a corporation of Delaware No Drawing. Original No. 1,898,458, dated February 21, 1933, Serial No. 506,490, January 3, 1931. Application for reissue September 14, 1934, Serial No. 744,088. In Germany January 18, 1930

10 Claims. (Cl. 260—37)

The present invention relates to new vat dyestuffs and methods for their production.

We have found that new and valuable vat dyestuffs are obtained by converting acridone- or thioxanthone carboxylic acids or their derivatives into acid amides having the general formula:

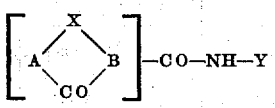

in which A is an anthraquinone radicle, B and Y represent cyclic radicles and X represents NH or S and wherein, if X represents NH, the said group —CO—NH—Y must be attached to A. Dyestuffs of this kind may be obtained for example by preparing, according to known methods, anthraquinoneacridone- or thioxanthone carboxylic acids which have the carboxyl group in the anthraquinone nucleus or anthraquinone thioxanthone carboxylic acids which have the carboxyl group in the part indicated by B in the above formula, the said acids (in the form of their halides) then being converted with amines in the manner already known into acid amides. An initial material which is very suitable for the preparation of the new dyestuffs is the 1-nitroanthraquinone-6-carboxylic acid which is formed as the main product by the nitration of anthraquinone-2-carboxylic acid in sulphuric acid monohydrate. The 1-nitroanthraquinone-6-carboxylic acid may for example be converted into 1-aminoanthraquinone-6-carboxylic acid by reduction, or it may be converted into 1-chloranthraquinone-6-carboxylic acid by treatment with chlorine in organic solvents of high boiling point, and may then be converted by any known or suitable method into the corresponding anthraquinoneacridone- or -thioxanthone carboxylic acids.

The dyestuffs obtainable according to the present invention are difficultly soluble in organic solvents. They give colored solutions in concentrated sulphuric acid and form brown to dark-blue vats with alkaline hydrosulphite solutions.

The following examples will further illustrate the nature of this invention, but the invention is not restricted to these examples. The parts are by weight.

*Example 1*

1.8 parts of 2,1(N)-anthraquinonebenzacridone-6-carboxylic acid chloride (obtainable from 1-chloranthraquinone-6-carboxylic acid by conversion into the benzyl ester, condensation with anthranilic acid, ring closure with sulphuric acid and heating with thionyl chloride in trichlorbenzene) are heated to boiling with 1.2 parts of 1-aminoanthraquinone in 40 parts of trichlorbenzene until the formation of dyestuff is completed. After cooling, the reaction mixture is filtered by suction, the dyestuff is purified by boiling up with about 300 parts of trichlorbenzene and if necessary crystallized from about 300 parts of trichlorbenzene. The dyestuff obtained which corresponds to the formula

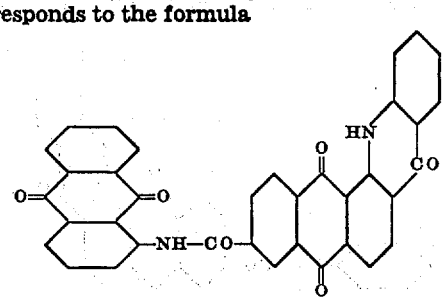

dyes cotton violet shades from a violet vat. The dyeings change to a fast red-brown in the air.

*Example 2*

2.4 parts of the chloride described in Example 1 are heated to boiling for a short time with 1.7 parts of 1-amino-4-methoxyanthraquinone in 60 parts of trichlorbenzene. The dyestuff is worked up in a manner similar to that described in Example 1. It corresponds to the formula

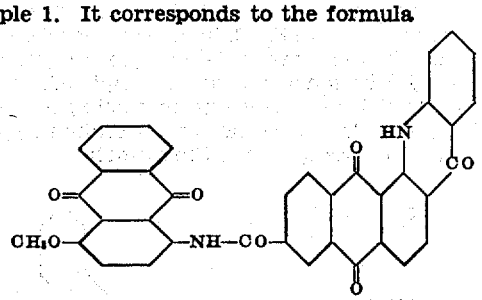

and dyes cotton powerful red-blown shades from a violet vat.

*Example 3*

1 part of the chloride described in Example 1 is heated to from 210° to 215° C. with 1 part of 1-amino-5-benzoylamino-anthraquinone in 20 parts of trichlorbenzene until the formation of dyestuff is completed. The dyestuff which separates out when the reaction mixture is cooled is preferably purified by boiling up with trichlorbenzene, vatting and allowing the vat to flow into chlorine liquor. It corresponds to the formula

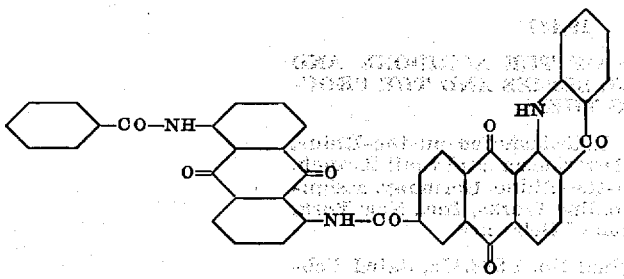

and dyes cotton brown shades from a red-violet vat.

*Example 4*

1 part of 2,1(S)-anthraquinonebenzthioxanthone-6-carboxylic acid chloride (obtainable for example from 1-chlor-anthraquinone-6-carboxylic acid by condensation with thiosalicylic acid, ring closure with sulphuric acid and treatment of the carboxylic acid obtained with phosphorus pentachloride is heated to boiling for a short time with 36 parts of aniline. The anilido derivative which separates out in the cold is filtered off by suction. It corresponds to the formula

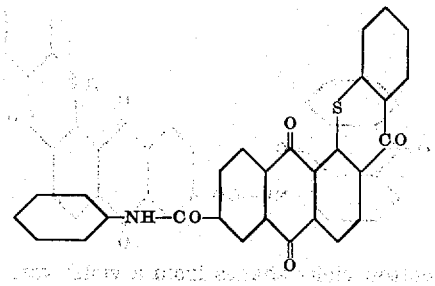

It dyes cotton violet shades from a violet vat. The dyeings change to an orange fast to chlorine in the air.

*Example 5*

1.4 parts of 2,1(S)-anthraquinonebenzthioxanthone-6-carboxylic acid chloride are heated to from about 210° to 215° C. in 20 parts of trichlorbenzene with 0.8 part of 1-aminoanthraquinone until the formation of dyestuff is completed. The dyestuff which separates out on cooling is preferably purified by treatment with sodium hypochlorite. It corresponds to the formula

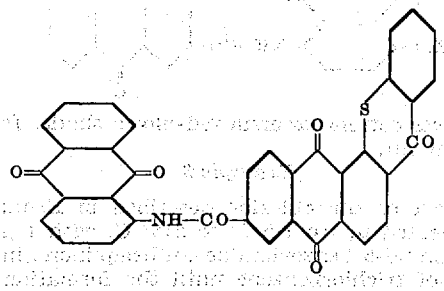

and dyes cotton reddish-yellow shades from a violet vat.

Other dyestuffs are obtained in an analogous manner by employing amino compounds other than 1-aminoanthraquinone. The properties of a few of such dyestuffs are given in the following table:

*Condensation products of 2,1(S)-anthraquinonebenzthioxanthone-6-carboxylic acid chloride with amines*

| Amine | Molecular proportions of amine to 1 molecular proportion of chloride | Color of vat | Shade of dyeings |
|---|---|---|---|
| Benzidine | ½ | Violet | Orange. |
| 1-amino-4-methoxy-anthraquinone | 1 | Violet | Reddish-yellow. |
| 1-amino-5-benzoyl-aminoanthraquinone | 1 | Violet | Reddish-yellow. |
| 1-amino-5-chloranthraquinone | 1 | Violet | Reddish-yellow. |
| 1,5-diamino-anthraquinone | ½ | Violet | Red-brown. |

*Example 6*

1.1 parts of the chloride of 2,1(N)-anthraquinone-6-carboxylic acid β,β'-naphthacridone (obtainable by condensation of 2-aminonaphthalene-3-carboxylic acid ethyl ester and 1-chloranthraquinone-6-carboxylic acid benzyl ester, effecting ring closure by means of an alkaline solution of hydrosulphite and converting the product into the acid chloride by a treatment with thionylchloride in trichlorbenzene) are heated to boiling for 10 minutes with 0.7 part of 1-aminoanthraquinone in 60 parts of trichlorbenzene. The dyestuff separates from the warm reaction mixture and may be purified after separation by boiling it with trichlorbenzene. It corresponds to the formula

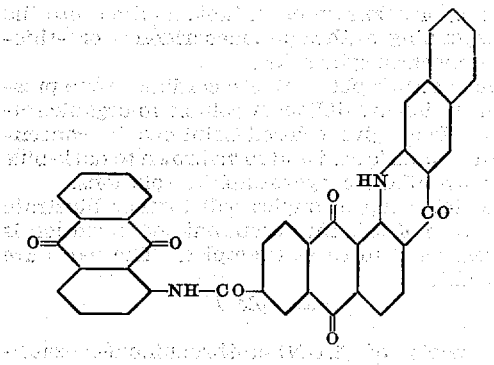

and dyes cotton from a greenish black vat the same shades which on exposure to the air change to olive green.

*Example 7*

3 parts of the initial material employed in Example 6 are heated to boiling for 10 minutes with 2.3 parts of o-amino-5-benzoylaminoanthraquinone in 160 parts of trichlorbenzene. The dyestuff is separated and purified as described in Example 6. It corresponds to the formula

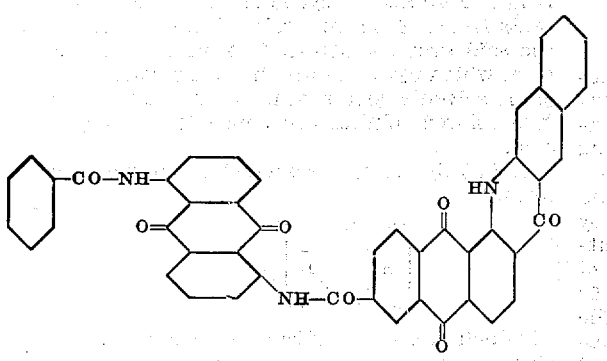

and dyes cotton green grey shades from a vat having the same coloration, the shades changing to a yellowish olive on exposure to the air.

*Example 8*

404 parts of 2,1(S)-anthraquinonethioxanthone-Bz4-carboxylic acid chloride (obtainable by condensing 1-chloranthraquinone-2-carboxylic acid with p-mercaptobenzoic acid, effecting ring closure by means of acetic anhydride with an addition of sulphuric acid and converting the product into the acid chloride by treatment with thionyl chloride in o-dichlorbenzene) are heated with 223 parts of alpha-aminoanthraquinone in 12,600 parts of nitrobenzene to about 140° C. while stirring for 2 hours, whereby the mixture becomes thick, hydrogen chloride escapes and the dyestuff is separated. The mass is cooled to 80° C. and the dyestuff filtered off by suction. It is a yellow crystalline powder which is difficultly soluble in nitrobenzene even in the warm. It dissolves in concentrated sulphuric acid with the formation of an orange yellow solution. With alkaline hydrosulphite the dyestuff furnishes a violet black vat from which the vegetable fibre is dyed clear golden yellow shades of excellent fastness. The product corresponds to the formula

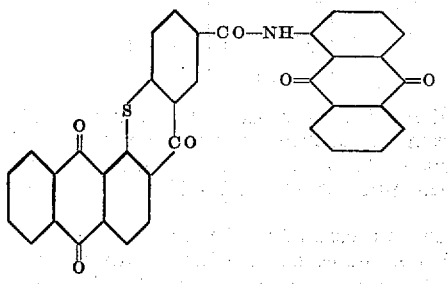

*Example 9*

If in the process according to Example 8 o-mercaptobenzoic acid is used instead of p-mercaptobenzoic acid and resulting 2,1(S)-anthraquinonethioxanthone-Bz2-carboxylic acid is condensed with 1-amino-5-benzoylamino-anthraquinone, a yellow dyestuff is obtained which dissolves in concentrated sulphuric acid to an orange yellow solution from which it is separated by the addition of water in golden yellow flakes. With alkaline hydrosulphite the dyestuff forms a dark violet vat from which the vegetable fibre is dyed clear golden yellow shades. The product corresponds to the formula

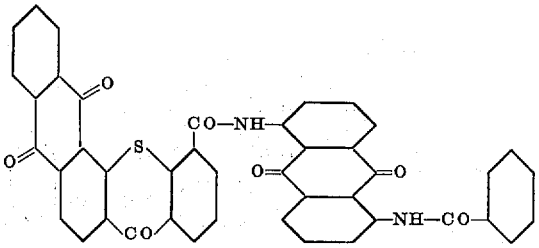

*Example 10*

If the 2,1(S)-anthraquinonethioxanthone-Bz2-carboxylic acid chloride used as initial material according to Example 9 is condensed with 1-amino-4-benzoylamino-anthraquinone, a dyestuff is obtained which dyes cotton from a violet vat orange red shades.

*Example 11*

4 parts of 3,2(S)-thioxanthoneanthraquinone-Bz2-carboxylic acid chloride (obtainable from 2-chlor-3-anthraquinone carboxylic acid by condensation with thiosalicylic acid in aqueous solution with the addition of caustic potash, effecting ring closure with concentrated sulphuric acid and converting the product into the carboxylic acid chloride by boiling with thionyl chloride in nitrobenzene) are heated with 2.3 parts of alpha-aminoanthraquinone in 180 parts of nitrobenzene to between 200° and 210° C. until hydrogen chloride is no longer evolved. After cooling, the yellow dyestuff which has separated out is filtered off by suction, washed and dried. With alkaline hydrosulphite the dyestuff yields a brown vat from which cotton is dyed clear greenish yellow shades. The product corresponds to the formula

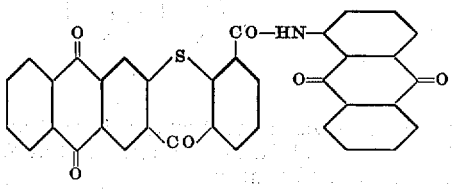

*Example 12*

If the initial material used according to Example 11 is condensed with 3.4 parts of 1-amino-5-benzoylamino-anthraquinone, a yellow crystalline dyestuff is obtained which yields a brown vat with alkaline hydrosulphite, from which cotton is dyed clear golden yellow shades.

*Example 13*

2 parts of 1,2(S)-anthraquinonethioxanthone-Bz2-carboxylic acid chloride (obtainable for example by condensing 1-cyano-2-bromo-anthraquinone with o-mercaptobenzoic acid, effecting saponification of the cyano group and simultaneous ring closure by means of sulphuric acid, and converting the product into the acid chloride by heating with phosphorus pentachloride) are heated to between 180° and 190° C. with 1.7 parts of 1-amino-5-benzoylamino-anthraquinone in 100 parts of nitrobenzene, until the formation of the dyestuff is complete. The resulting yellow dyestuff separates from the nitrobenzene while still hot; it is filtered off by suction and freed from nitrobenzene by washing with for example benzene. The dyestuff corresponds to the formula

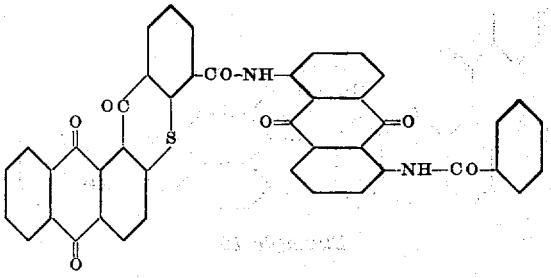

and dyes cotton from a greenish black vat greenish yellow shades. It dissolves in concentrated sulphuric acid with a yellowish brown coloration.

*Example 14*

4 parts of 4-amino-N-methyl-pyrimidoneanthrone are heated to between 170° and 180° C. with 2 parts of 2,1(S)-anthraquinone-thioxanthone-6-carboxylic acid chloride in 100 parts of nitrobenzene, until the formation of the dyestuff is complete. The dyestuff separates from the nitrobenzene while still hot; it is filtered off by suction and freed from nitrobenzene by washing with for example benzene. The product corresponds to the formula

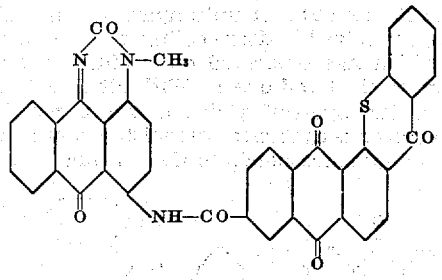

It dissolves in concentrated sulphuric acid giving reddish orange solutions and dyes cotton from a violet vat orange shades.

What we claim is:—

1. Vat dyestuffs corresponding to the general formula

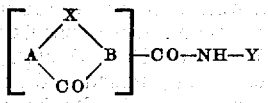

in which A indicates an anthraquinone radicle, B and Y represent cyclic radicles and X represents NH or S and wherein, if X represents NH, the said group —CO—NH—Y must be attached to A, which dyestuffs are difficultly soluble in organic solvents, give brown to dark-blue vats and give colored solutions in concentrated sulphuric acid.

2. Vat dyestuffs corresponding to the general formula

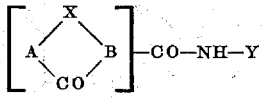

in which A and Y indicate anthraquinone radicles, B represents a benzene or naphthalene radicle and X represents NH or S and wherein, if X represents NH, the said group —CO—NH—Y must be attached to A, which dyestuffs are difficultly soluble in organic solvents, give brown to dark-blue vats and give colored solutions in concentrated sulphuric acid.

3. Vat dyestuffs corresponding to the general formula A—NH—Y, in which A indicates an anthraquinonethioxanthone carboxylic acid radicle and Y indicates an anthraquinone radicle, which dyestuffs are difficultly soluble in organic solvents, give brown to dark-blue vats and give colored solutions in concentrated sulphuric acid.

4. The process of producing new vat dyestuffs which comprises condensing with a primary aromatic amine a compound of the general formula

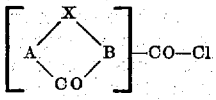

in which A indicates an anthraquinone radicle, B represents a benzene or naphthalene radicle, X indicates NH or S, and wherein, if X represents NH, the said group —CO—Cl must be attached to A.

5. The process of producing new vat dyestuffs which comprises condensing with an aminoanthraquinone a compound of the general formula

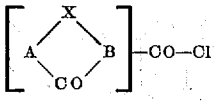

in which A indicates an anthraquinone radicle, B represents a benzene or naphthalene radicle, X indicates NH or S, and wherein, if X represents NH, the said group —CO—Cl must be attached to A.

6. The process of producing new vat dyestuffs which comprises condensing an anthraquinone-thioxanthone-carboxylic acid chloride with an aminoanthraquinone.

7. The process of producing new vat dyestuffs which comprises condensing an anthraquinone-thioxanthone-carboxylic acid chloride with an aminoanthraquinone in an inert organic solvent.

8. The process of producing a new vat dyestuff, which comprises condensing 1,2(S)-anthraquinonethioxanthone-Bz2-carboxylic acid chloride with 1-amino-5-benzoyl-amino-anthraquinone in nitrobenzene.

9. The vat dyestuff corresponding to the formula

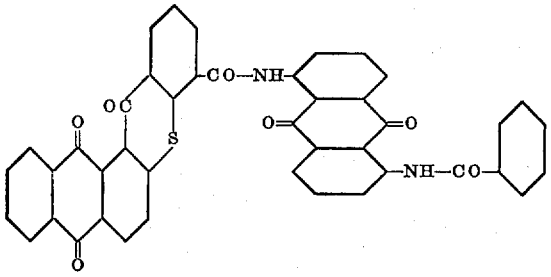

which dyestuff dyes cotton from a greenish black vat greenish yellow shades and dissolves in concentrated sulphuric acid with a yellowish brown coloration.

10. The vat dyestuff corresponding to the formula

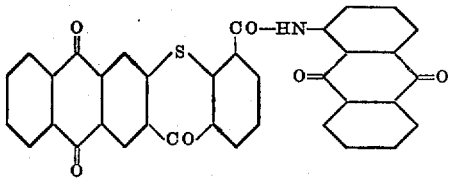

which dyestuff dyes cotton clear greenish yellow shades from a brown vat.

PAUL NAWIASKY.
WILHELM BAUER.
EMIL KRAUCH.